April 21, 1931. A. F. WALKER 1,802,294
SHELL CRACKING AND KERNEL EXTRACTING MACHINE
Filed Feb. 26, 1930 3 Sheets-Sheet 1
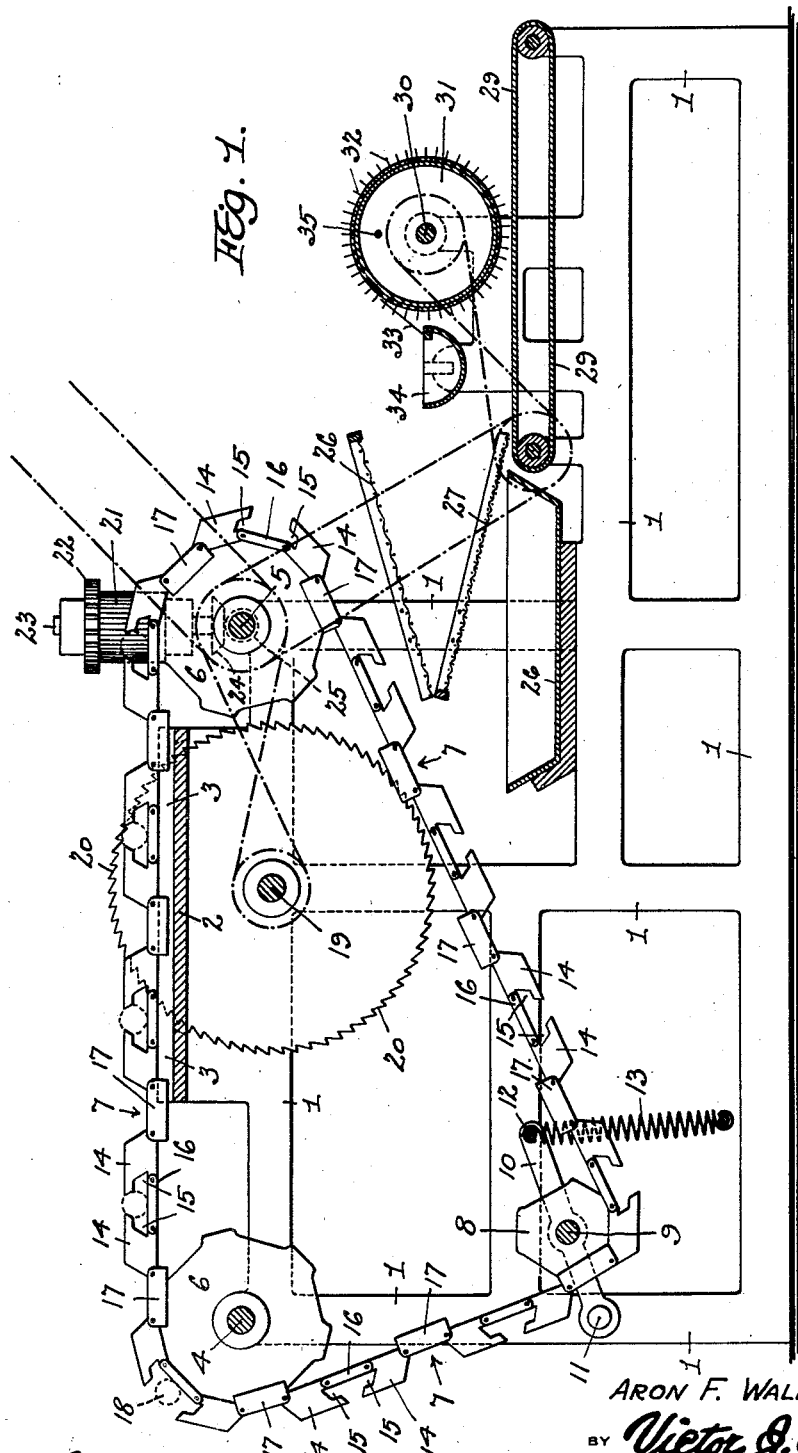
ARON F. WALKER INVENTOR

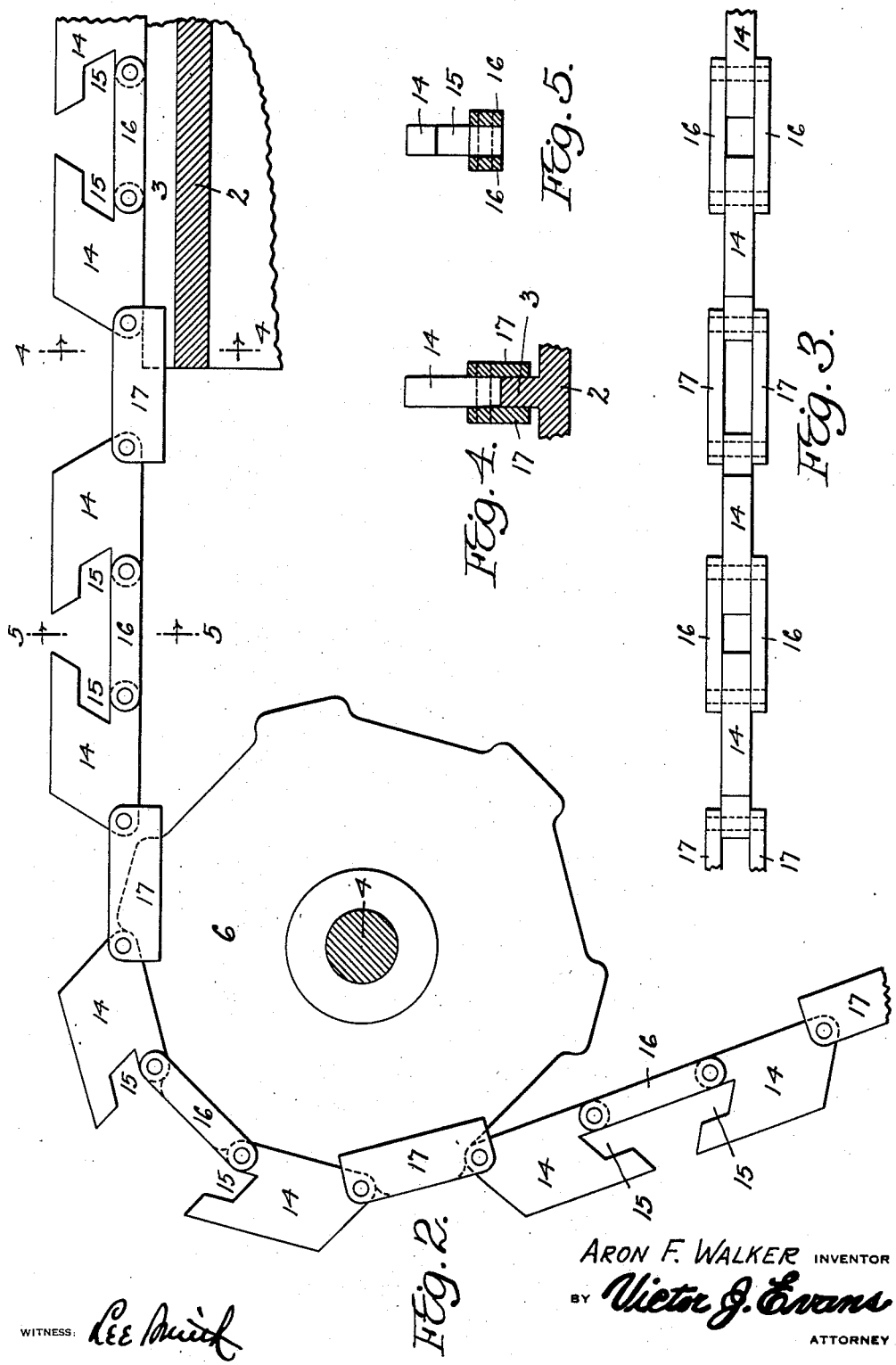

April 21, 1931.  A. F. WALKER  1,802,294
SHELL CRACKING AND KERNEL EXTRACTING MACHINE
Filed Feb. 26, 1930  3 Sheets-Sheet 3
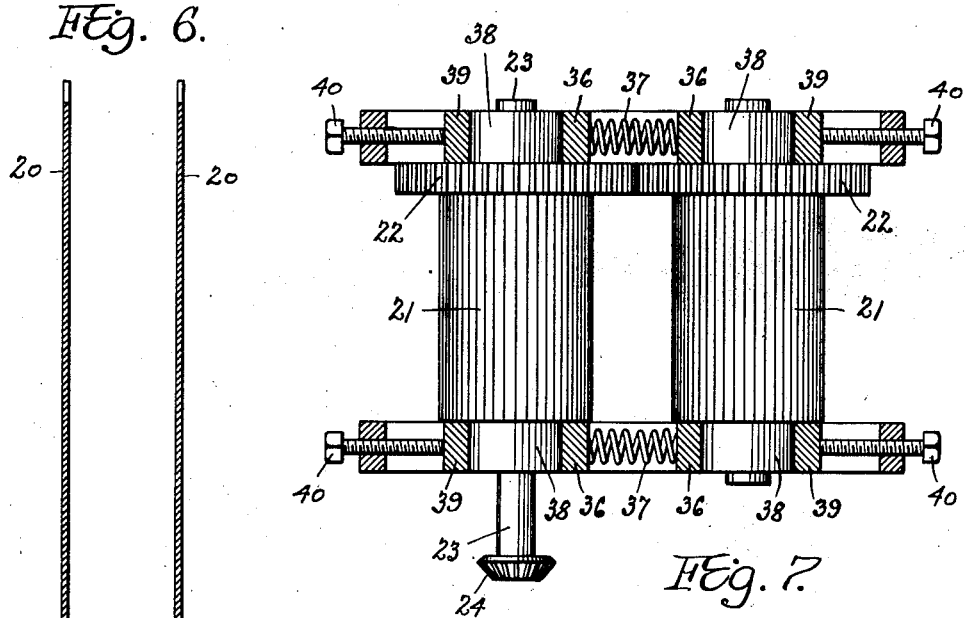
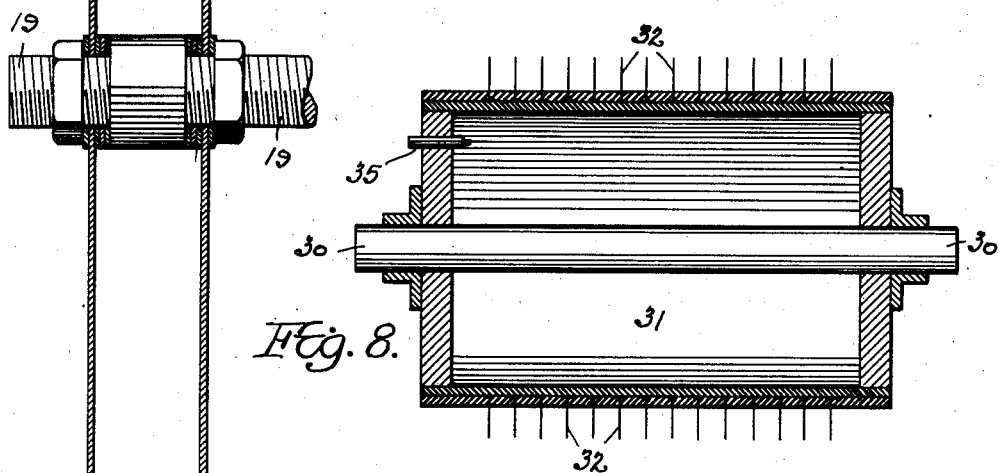
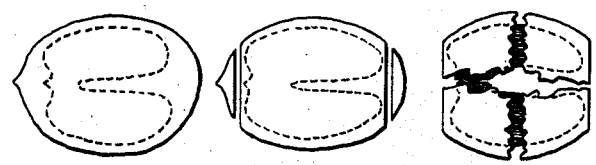
ARON F. WALKER INVENTOR Patented Apr. 21, 1931

1,802,294

UNITED STATES PATENT OFFICE

ARON F. WALKER, OF EXETER, MISSOURI

SHELL-CRACKING AND KERNEL-EXTRACTING MACHINE

Application filed February 26, 1930. Serial No. 431,480.

This invention relates to a machine for cracking the shells and extracting the kernels or meats from walnuts, pecans, hickory nuts and other nuts that have similar shell construction, and has for its primary object the provision of a machine for this purpose which will singly grip the nuts, deliver the same between saws for severing the ends from the shells of the nuts, for subjecting the nuts to pressure at their sawed ends, said pressure causing the shell to burst and spring outward leaving the kernel free from the shell, said pressure to be applied by means of rollers or other devices capable of producing inward pressure at each sawed end of the nut, release the cracked nuts to direct the major portions of the shells into a pan and to deliver the remainder or minor portions of the shells, nuts or kernels onto a conveyor and subjecting the kernel or meat to the action of a picker which will pierce, elevate and convey the meat into a trough to permit of the shells passing onto the conveyor therebeneath.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claims.

In the drawings:

Figure 1 is an approximately central vertical longitudinal sectional view through a black walnut or other nut cracking and kernel extracting machine in accordance with this invention.

Figure 2 is an enlarged side elevation of the chain conveyor with a portion thereof traveling over the guide rail therefor.

Figure 3 is a plan view of the chain conveyor.

Figure 4 is a sectional view approximately on the line 4—4 of Figure 2.

Figure 5 is a sectional view approximately on the line 5—5 of Figure 2.

Figure 6 is an approximately central transverse sectional view through the circular saws.

Figure 7 is a plan view of the cracking or crushing rollers.

Figure 8 is a substantially longitudinal sectional view through the drum that comprises the pneumatic picker.

Figure 9 is a plan view of a nut, illustrating by dotted lines the meat or kernel therein.

Figure 10 is a similar view but showing the ends of the nut severed by the saws.

Figure 11 is a similar view but showing the shell cracked to permit of the meat or kernel dropping therefrom.

As disclosed by Figure 1 of the drawings I make use of a suitable frame 1. The frame has what I will term its rear end elevated, and the said elevated portion has its sides, at the top thereof connected by a plate 2, and this plate is centrally provided with a longitudinally extending rib 3 that affords a rail for the walnut gripping and conveying chain which will presently be described.

The upper corners at the elevated end of the frame 1 have journaled therein suitable shafts 4 and 5, respectively, and fixed on each of these shafts there is a sprocket wheel 6, respectively. By reference to the drawings it will be noted that the sprocket wheels 6 have comparatively long teeth.

There is trained around the sprocket wheels 6 the chain that provides an important element of this invention. The chain is broadly indicated by the numeral 7. The chain is also trained around an idler sprocket wheel 8 whose shaft 9 is revoluble in bearings in a pair of arms 10, the said arms being pivotally secured, as at 11, to the sides of what I will term the rear of the frame. The free ends of the arms are connected by a shaft or rod 12, and to this shaft or rod there is secured one end of a helical spring 13, the second end of the spring being fixed adjacent to the base of the frame 1. The idler sprocket 8 is in the nature of a chain tightening member as well as a guide for the chain. The tightening of the chain increases the gripping power of the jaws in chain and automatically adjusting jaws of the chain to accommodate any size nut.

As stated, the chain 7 is of a particular and peculiar construction, the same including pairs of links which are in the nature of blocks which are indicated by the numeral 14. The blocks 14 have their confronting ends cut at inward inclinations and the said ends are centrally notched, as at 15. This provides the confronting faces of the blocks 14 with pincher-like jaws. The inner ends of the blocks 14 are pivoted together by links 16, while the outer ends of the blocks are pivotally connected by plates 17 which depend a suitable distance beyond the inner edges of the said blocks. The plates ride over the sides and respective sprocket wheels 6 and 8 and likewise ride over the sides of the rails 3. The pincher-like jaws of the block elements of the sprocket chain are brought toward each other when the links of said sprocket chain are in longitudinal alinement but these jaws will spread apart when traveling over the sprocket wheels 6, as clearly disclosed by Figures 1 and 2 of the drawings. Thus the spread jaws traveling over the outer sprocket wheel 6 can readily receive therebetween a black walnut 18 and the sides of this walnut are gripped by the pincher-like jaws when the links of the chain are in longitudinal alinement and travel over the rail of the plate 2. Thus it will be noted that the black walnuts or other nuts are effectively and rigidly held between the jaws.

Fixed on a suitable shaft or mandrel 19 that is journaled in the sides of the frame 1 there is a pair of spaced circular saws 20. These saws have their upper portions received through suitable slots in the plate 2, the said slots being disposed at the opposite sides of the rail 3. The saws 20 are so spaced that they will cut the ends of walnuts which are brought therebetween as best disclosed by Figure 10 of the drawings.

The chain also delivers the walnuts, with their ends cut therefrom between a pair of peripherally ribbed cracking or crushing rollers 21. The rollers 21 are preferably integrally formed with intermeshing wheels 22 and the said rollers are, of course, provided with shafts which are suitably journaled in the frame. One of these shafts, indicated for distinction by the numeral 23, has on its lower end a beveled gear 24 which is in mesh with a similar gear 25 that is fixed on the shaft 5. As disclosed by the drawings the shafts 4, 5 and 19 have trained therearound suitable belts for turning the said shafts and any suitable source of power may be provided for imparting motion to the belts. One of the shafts which carry the rollers must have movable bearings so that the distance between the rollers can be adjusted. Also the intermeshing wheels 22 must have teeth long enough to allow for this adjustment. An adjustment of one-fourth inch each way is enough.

The kernel of a black walnut, pecan, hickory and kindred nuts comprises upper and lower lobe meat sections which are connected at one of their ends, and the meat in the nut is disposed a suitable distance away from the ends of the shell thereof. Thus nuts of different lengths and widths may be effectively gripped by the jaws of the chain and cut by the saws. By cutting away the ends of the shell the shell may be crushed or cracked by the rollers 21 and the cracking of the shell will sever the connected end of the meat or kernel in the shell, thus after the chain passes through the crushing or cracking rolls the cooperating jaws of the chain that travel over the inner sprocket wheel 6 are opened and thus permit of the cracked shell and the meat dropping upon a downwardly inclined wire mesh 26 that provides the bottom for a suitable frame. The mesh 26 is wide so that the meat will pass therethrough and the major portion of the shell will gravitate thereover and drop into a pan 26. The walnut meat or kernel after passing through the mesh 26 will be directed onto a second and oppositely inclined mesh 27. The mesh 27 is comparatively fine and delivers the meat and the small particles of shells that drop through the mesh 26 onto an endless belt conveyor 29. The conveyor is arranged upon the reduced portion of the frame and may be of any desired length. Journaled in suitable bearings in the sides of the frame, directly above the conveyor is the shaft 30 for a drum 31. While I have disclosed only one drum in the drawings any desired number may be employed, and in the successful operation of my machine I believe it will be necessary to employ at least two or more of such drums. The side of each of the drums is preferably in the nature of a wooden disc that is covered by inner and outer sheets of vulcanized rubber or the like. The outer peripheral sheet of rubber has passed therethrough the headed ends of tacks 32. The pointed ends of the tacks are arranged directly over the conveyor 29. The drum is thus in the nature of a picker member and it will be obvious that the tacks 32 will embed themselves in the soft meat and raise themselves in the direction of the arrow as disclosed by Figure 1 of the drawings, while the hard shells contacting with the periphery of the picker will depress the same and will pass therebeneath. The periphery of the drum at the receiving side thereof is engaged by a comb-like member 33 which is fixedly secured upon one end of a trough or like receptacle 34, the same being suitably supported between the sides of the frame. Preferably the trough or receptacle 34 is arranged at an inclination so that the meat will gravitate therethrough.

As disclosed by the drawings belts are arranged to operate the conveyor 29 and the picker 31, and also as disclosed by Figure 8 of the drawings one end of the picker is provided with an air inlet that is closed by a valve 35 of the ordinary automobile type.

While I have shown a machine where circular saws are specified it is obvious that any type of saws would saw the ends from the nuts. Also it is possible that many other cracking devices could be used with similar results as obtained with rollers.

It is an important feature of the invention that all of the nuts of the same thickness be subjected to the same pressure between shell cracking rollers 21 and to accomplish this and as disclosed by Figure 7 of the drawings the non-toothed and non-serrated rounded ends of the rollers have arranged therebetween segmental bearings 36 which are urged away from each other by springs 37. The said non-threaded end portions 38 of the rollers have their outer faces contacted by similar segmental bearings 39 which are received in suitable slots or openings in the frame of the device and which have their outer and straight faces contacted by adjusting bolts 40 which, of course, are screwed through the sides of the frame. It is, of course, to be understood that the teeth of the intermeshing wheels 22 are long to permit of the adjustment of the crushing rollers with respect to each other. It is also to be understood that the adjustment between the rollers is comparatively slight and such adjustment is rarely more than a quarter of an inch.

Having described the invention, I claim:

1. In a nut shell cracking and meat extracting machine, an endless chain conveyor and sprocket wheels over which the chain is guided, one of said sprocket wheels being pivotally supported and spring influenced to tension the chain, the links of the chain comprising pairs of spaced blocks having their confronting ends notched to provide the same with nut gripping jaws, short links pivotally securing the said pairs of blocks, plates pivotally connecting the outer ends of the blocks, a pair of saws between which the chain travels, a bed plate having a rail over which the chain is guided and with the sides of which rail the depending plates contact, and a pair of crushing rolls between which the chain also travels 2. In a nut shell cracking and meat extracting machine, a chain conveyor having pairs of links providing cooperating nut gripping jaws, a pair of saws between which the chain travels and crushing rollers between which the chain also travels, said crushing rolls having non-serrated ends, inner segmental bearings contacting said ends, springs between the bearings urging the same away from each other, outer segmental bearings contacting said ends and adjustable means engaging said outer bearings for adjusting the crushing rollers with respect to each other.

3. In a nut shell cracking and meat extracting machine, an endless chain conveyor and sprocket wheels over which the chain is guided, one of said sprocket wheels being pivotally supported and spring influenced to tension the chain, the links of the chain comprising pairs of spaced blocks having their confronting ends notched to provide the same with nut gripping jaws, short links pivotally securing the said pairs of blocks, plates pivotally connecting the outer ends of the blocks, a pair of saws between which the chain travels, a bed plate having a rail over which the chain is guided and with the sides of which rail the depending plates contact, and a pair of crushing rolls between which the chain also travels, and the chain tensioning means regulating the gripping engagement of the jaws with the nut.

In testimony whereof I affix my signature.

ARON F. WALKER.